United States Patent [19]

Harry et al.

[11] Patent Number: 5,169,168
[45] Date of Patent: Dec. 8, 1992

[54] BALL HITCH ASSEMBLY

[75] Inventors: Edward G. Harry, Gresham; Donald R. Schneider, Neenah, both of Wis.

[73] Assignee: Harwal Machine, Inc., Gresham, Wis.

[21] Appl. No.: 687,631

[22] Filed: Apr. 19, 1991

Related U.S. Application Data

[63] Continuation-in-part of Ser. No. 599,044, Oct. 17, 1990, abandoned, which is a continuation-in-part of Ser. No. 541,073, Jun. 21, 1990, abandoned.

[51] Int. Cl.$^5$ .............................................. B60D 1/06
[52] U.S. Cl. ........................................ 280/511; 403/349
[58] Field of Search ............... 280/511; 403/349, 348, 403/131, 165, 78; 411/411, 417

[56] References Cited

U.S. PATENT DOCUMENTS

| | | | |
|---|---|---|---|
| 1,033,187 | 7/1912 | Metzger | 403/349 |
| 2,060,523 | 11/1936 | Packer | 403/349 |
| 2,189,710 | 2/1940 | Draeger | 280/511 |
| 2,601,088 | 6/1952 | Burgess | 403/349 |
| 2,660,457 | 11/1953 | Mallon | 403/349 |
| 3,478,302 | 11/1969 | Chirumbolo | 403/349 |
| 4,076,105 | 2/1978 | Aono | 403/349 |
| 4,433,854 | 2/1984 | Smith | 403/131 |
| 4,518,162 | 2/1985 | Oates | 403/349 |
| 4,889,356 | 12/1989 | Morris | 403/131 |

Primary Examiner—Karin L. Tyson
Attorney, Agent, or Firm—Wood, Phillips, VanSanten, Hoffman & Ertel

[57] ABSTRACT

A ball hitch assembly consisting of: a center pin mountable on a tow bar and having an axial extent; a hitch ball with a central opening mountable on the center pin; a cooperating locking pin and groove structure provided one on the center pin and the other on the hitch ball, with the groove having an entryway through which the locking pin can pass as the center pin is directed into the hitch ball central opening, with the locking pin being movable within the groove to allow the hitch ball to be placed in an operative position on the center pin; and locking structure defined cooperatively by the locking pin and groove for preventing the hitch ball in its operative position from being disassembled from the center pin by drawing the hitch ball in one axial direction and turning the hitch ball in either direction of rotation about the axis of the center pin.

29 Claims, 4 Drawing Sheets

BALL HITCH ASSEMBLY

CROSS REFERENCE

This application is a continuation-in-part of application Ser. No. 599,044, filed Oct. 17, 1990, and now abandoned entitled "Ball Hitch Assembly", which is a continuation-in-part of Ser. No. 541,073, filed Jun. 21, 1990, now abandoned.

BACKGROUND OF THE INVENTION

1. Field of the Invention

This invention relates to ball hitch assemblies of the type commonly used on towing vehicles to be engaged by a trailer coupler and, more particularly, to a ball hitch assembly with interchangeable hitch balls and structure for preventing inadvertent disassembly of the hitch ball in use.

2. Background Art

A conventional ball hitch assembly has a hitch ball secured to a towing vehicle bumper or tow bar. Conventional trailers have a tongue with a forward coupler defining a receptacle for the hitch ball. A latching mechanism, of which there are many different types in the prior art, is engaged to maintain the hitch ball in the coupler receptacle. With the latching mechanism engaged, the hitch coupler is allowed to pivot relative to the ball hitch assembly as required when the towing vehicle is turned relative to the trailer. Typically, such ball hitch assemblies provide for relatively easy connection and disconnection of the trailer coupler relative to the hitch ball and enable pivoting of the towed trailer through a relatively wide angle about the axis of the hitch ball.

For various reasons, including strength requirements, trailer manufacturers select a particular size receptacle for the trailer coupler. The receptacle size may vary from one manufacturer to the next for the same trailer size. It is necessary to have the hitch ball sized relatively close to the size of the receptacle on the trailer hitch coupler and, therefore, it is frequently necessary to change the size of a hitch ball on a towing vehicle to accommodate different trailers.

Manufacturers offer hitch balls of different diameters. It is common to construct these hitch balls integrally with a mounting shank/center pin which is affixable to the tow bar/bumper. Commonly, the shank/center pin will have its end remote from the ball threaded to accept a locking nut. The locking nut, in conjunction with a shoulder on a midportion of the shank/center pin captures the wall of the bumper/tow bar through which the shank extends. To interchange hitch ball assemblies, the lock nut is removed from the free end of the shank which is then separable from the tow bar/bumper.

The one-piece shank/center pin and ball assemblies in the prior art have serious drawbacks. First of all, if the user intends to tow many different trailers, it may be necessary to store and have available in the towing vehicle a wide range of hitch ball assemblies. Apart from this inconvenience, it is generally relatively expensive to purchase the all-in-one ball hitch assemblies.

Another problem with the integral ball and shank/center pin construction is that it is very inconvenient to have to remove the shank/center pin from the tow bar/bumper each time a trailer requires a different size hitch ball. It is common for the threads on the shank/center pin to become damaged during use, which may make it difficult or impossible to turn the nut off of the shank/center pin end. Further, the threaded free end of the shank/center pin is exposed to the elements and commonly submerged in water so that it has a tendency to rust. This makes removal of the nut even more difficult and, in some instances, may require that the shank/center pin be cut to effect removal of the assembly.

To overcome the above difficulties, prior art ball hitch designers have devised systems employing interchangeable hitch balls. One such structure is shown in U.S. Pat. No. 4,433,854, to Smith. Smith discloses a hitch ball with an inside annular groove into which a spring biased locking pin projects to prevent separation of the hitch ball from the shank/center pin. To release the hitch ball, the user depresses the pin through an access opening in the hitch ball while drawing up on the hitch ball. The employment of moving parts, such as the slidable locking pin in Smith, makes such a structure prone to failure. If the pin jams or the spring fails, which is a likelihood after a long exposure to a wet environment, the hitch ball can separate from the shank/center pin, which then dangerously frees the trailer from the towing vehicle.

U.S. Pat. No. 4,596,406, to Van Vleet et al, shows a removable hitch ball that is held in place by a locking pin that extends entirely radially through both the hitch ball and the shank/center pin. One has the inconvenience of keeping track of separate parts, i.e. the locking pin, without which the device is inoperable. The pin, in use, is also prone to shearing, bending, or becoming locked in place, as when it rusts. The pin is also prone to working loose, falling out, and becoming lost, when the trailer coupler is not attached to the hitch ball.

U.S. Pat. No. 4,522,421, to Vance, and U.S. Pat. No. 4,201,400, to Hoogenbosch, disclose a plunger and ball structure for releasably locking a hitch ball to its mounting. These two structures have the same drawbacks as those prior art structures previously discussed, i.e. they are subject to parts breakage, loss of parts, and failure to operate properly due to exposure to weather and foreign material.

While the prior art structures have afforded the convenience of hitch ball interchangeability, they have frequently done so at the expense of safety. Because a failure of the ball hitch assembly could be dangerous not only to the passengers in the towing vehicle, but to surrounding vehicles and persons, it is of the utmost importance that safety not be compromised for the sake of convenience.

SUMMARY OF THE INVENTION

The present invention is specifically directed to overcoming the above enumerated problems in a novel and simple manner.

A primary feature of the invention is to provide a new and improved ball hitch assembly providing for interchangeability of different diameter hitch balls without the use of any special tools and by simple pin and groove structure using a fixed pin whereby there are no moving parts that can fail.

More particularly, an object of the invention is to provide a ball hitch assembly having a center pin mountable to a tow bar or other structure and a hitch ball having a central opening with the hitch ball being releasably locked to the center pin by a coacting fixed locking pin and groove structure associated one with the hitch ball and the other with the center pin. The groove structure has a circumferential locking groove to releasably hold the fixed locking pin and a partially spiral groove providing for access to the locking groove by a twisting motion of the hitch ball along with movement thereof axially of the center pin.

In a preferred embodiment of the ball hitch assembly, the fixed locking pin is mounted to the hitch ball and extends into a central opening of the hitch ball and the groove structure is formed about the perimeter of the center pin. The locking groove extends circumferentially of the center pin at a distance from an end thereof and with the groove provides access to the locking groove and has an entry end at said end of the center pin and spiral and circumferential components extending between the entry end and the locking groove. The circumferential locking groove is generally semicircular in cross section with the fixed locking pin having a smaller spherical end to fit loosely within the locking groove. The center pin has an external snap ring at a distance from an end of said center pin to physically locate the hitch ball lengthwise of the center pin with the fixed locking pin generally centrally positioned within the locking groove to permit free rotation of the hitch ball relative to the center pin.

The ball hitch assembly enables the interchangeability of hitch balls of different diameters and with all of the hitch balls having the fixed locking pin at the same distance from one end of the hitch ball and with the larger hitch balls having their dimensions shortened in the direction of the central opening thereof whereby each ball has the same position relative to the external snap ring and the locking groove.

Another object of the invention is to provide a ball hitch assembly enabling ready interchange of different diameter hitch balls and having a plurality of hitch balls of different diameter with each hitch ball having a central opening and a fixed locking pin extending into the central opening, a center pin attachable to a tow bar and having a circumferential locking groove, and an additional groove having an entry end at an end of the center pin and being at least partially spiral to lead to the locking groove whereby a fixed locking pin can be placed into and removed from the locking groove by a twisting and axial motion of the hitch ball relative to the center pin.

Still another object of the invention is to provide a ball hitch assembly having a center pin mountable on a tow bar, a hitch ball with a central opening mountable on said center pin, and a fixed locking pin and groove structure provided one on said center pin and the other on said hitch ball and including a first groove section enabling rotation of the hitch ball on the center pin with the locking pin retained in the groove and a second groove section defining an access path for the locking pin to the first groove section by twisting of the hitch ball.

Still another object of the invention is to provide a ball hitch assembly having a center pin mountable on a tow bar, a hitch ball with a central opening mountable on said center pin, a locking groove extending circumferentially of said center pin, a locking pin fixed to said hitch ball and extending into said central opening and of a size to fit loosely in said locking groove while preventing pull-off of the hitch ball, and at least a partially spiral groove on said center pin extended between an end of the center pin and said locking groove whereby the hitch ball can be placed in operative position on the center pin by placement of the locking pin in the groove at the end of the center pin and then twisting the hitch ball while moving the hitch ball axially of the center pin to bring the locking pin to the level of the locking groove.

An additional object of the invention is to provide a ball hitch assembly as defined in the preceding paragraph wherein there is an external snap ring on the center pin to limit movement of the hitch ball axially of the center pin and place the locking pin in the locking groove intermediate the top and bottom thereof.

A further object of the invention is to provide a ball hitch assembly as defined in the preceding paragraph wherein a plurality of interchangeable hitch balls of differing diameter may be mounted on the center pin, with the center pin having structure for locating the smallest diameter hitch ball lengthwise of the center pin as provided by the external snap ring. All of the hitch balls have their fixed locking pin at the same distance from one end thereof to establish a common location of said fixed locking pins relative to an end of the center pin. The larger diameter hitch ball is shortened in the direction of the central opening to have the same length axially of the center pin as the smallest diameter hitch ball.

The present invention further comprehends a ball hitch assembly consisting of: a center pin mountable on a tow bar and having an axial extent; a hitch ball with a central opening mountable on the center pin; a cooperating locking pin and groove structure provided one on the center pin and the other on the hitch ball, with the groove having an entryway through which the locking pin can pass as the center pin is directed into the hitch ball central opening, with the locking pin being movable within the groove to allow the hitch ball to be placed in an operative position on the center pin; and locking structure defined cooperatively by the locking pin and groove for preventing the hitch ball in its operative position from being disassembled from the center pin by drawing the hitch ball in one axial direction and turning the hitch ball in either direction of rotation about the axis of the center pin relative to the center pin.

The principal objective of the above structure is to facilitate interchangeability of hitch balls while preventing inadvertent separation of the hitch ball from the center pin. There are times when a trailer coupler will have a tendency to lift up, as during a turn. In the absence of the locking structure, it would be possible during this maneuver for the hitch ball to disassemble from the center pin, with obvious serious consequences. With the inventive structure, this cannot occur.

In a preferred form, the locking pin has a first generally circumferential groove section, a second groove section extending generally axially with respect to the center pin, a third groove section having at least a part thereof spaced axially from the first groove section, and a fourth transition groove section between the third and first groove sections. The groove sections are arranged so that the locking pin resides in the first groove section with the ball in its operative position on the center pin. The locking pin passes consecutively through the groove entryway, the second groove section, the third groove section, the fourth transition groove section, and into the first groove section to realize its operative position on the center pin.

In a preferred form, the first groove section extends through at least 180° to allow free pivoting of the hitch ball on the center pin through the normal range of relative pivoting contemplated between the towing vehicle and trailer.

In a preferred form, the second and fourth groove sections are substantially straight, in parallel relationship, and aligned generally axially with respect to the center post. The third groove section preferably extends generally in a circumferential direction on the center pin.

In a preferred form, the groove is bounded by guide walls for the locking pin and with the hitch ball in its operative position the pin and guide walls provide the sole structure for preventing axial shifting of the hitch ball relative to the center pin. This obviates the need for a fixed, upwardly facing supporting abutment for the hitch ball, which abutment can be integrally formed with the shank/center post or separately provided as in the form of a snap ring.

The invention also contemplates that the locking pin have a first generally circumferential groove section and a second groove section communicating between the groove entryway and the first groove section, with the second groove section having a wall for guiding axial movement of the locking pin between the entryway and the first groove section and the guide wall having an axially offset safety locking pocket defined therein to receive the locking pin and thereby arrest rotation of the hitch ball being urged from its operative position axially in one direction and rotated in one direction relative to the center pin, to thereby prevent inadvertent separation of the hitch ball from the center pin.

The second groove section extends in a generally circumferential direction at the portion of the second groove section where the pocket is located The first groove section extends through preferably at least 180° about the center pin. The second groove part is smoothly inclined between the groove entryway and the first groove section.

In a preferred form, the first groove section has circumferentially spaced ends, the fourth transition groove section communicates between the third groove section and one of the first groove ends and there is a fifth groove section communicating between the third groove section and the other of the first groove ends.

In a preferred form, the second, third and fourth groove sections and the second, third and fifth groove sections, in combination, each define a J-shape.

Another aspect of the invention is the provision of structure on the center pin axially spaced from the hitch ball in its operative position for preventing shifting of the hitch ball axially in one direction relative to the center pin. This provides a solid foundation for the hitch ball in its operative position on the center pin.

The invention also contemplates a combination of (a) a ball hitch assembly having a center pin mountable on a tow bar and an axial extent, a hitch ball with a central opening mountable on the center pin in an operative position, cooperating locking pin and groove structure one on the center pin and the other on the hitch ball, and structure on the locking pin and groove for allowing the hitch ball to be placed in its operative position only by aligning the locking pin with the groove entryway, directing the hitch ball axially in a first direction relative to the locking pin to a transition position, pivoting the hitch ball about the center pin axis a predetermined amount relative to the center pin and thereafter urging the hitch ball axially oppositely to the first direction into its operative position; and (b) a hitch coupler having a receptacle for the hitch ball and structure with the hitch coupler operatively connected to the ball hitch assembly for preventing the hitch ball from moving from its operative position axially in the first direction as might allow the hitch ball to trace back the assembly path for the ball hitch assembly and thereby disassemble from the center pin.

With the above structure, once the hitch ball is in its operative position and a hitch coupler operatively connected thereto, the hitch ball is prohibited from moving axially as required for the locking pin to find its way out of the groove to release the hitch ball from the center pin.

In a preferred form, the groove has a J-shaped configuration with the longer leg of the J communicating with the groove entryway and the shorter leg allowing the locking pin to move axially with respect to the center pin so that the hitch ball is in its operative position.

In a preferred form, the pin is fixedly attached to the hitch ball so that the pin is not prone to misaligning with or separating from the hitch ball.

The present invention further comprehends a ball hitch assembly wherein the groove has a first generally circumferential groove section, a second groove section extending generally axially with respect to the center pin, a third groove section defining a wall which causes the hitch ball passing through the groove entryway in a first axial direction to be turned from a first rotational position to a second rotational position, and a fourth transition groove section for guiding movement of the locking pin, with the hitch ball in its second rotational position, into the first groove section by movement of the hitch ball in a direction opposite to the first axial direction.

Preferably, the first and fourth groove sections are substantially parallel to each other and the axis of the center pin.

The fifth groove section defines a wall which defines an inverted V shape with the wall on the third groove section. Preferably, the first groove section is substantially straight and the V defined by the walls of the third and fourth groove sections is in the line of the first groove section.

Preferably, the first groove section has circumferentially spaced ends, the fourth transition groove section communicates with one of the circumferentially spaced ends of the first groove section and there is a sixth transition groove section communicating between the fifth groove section and the other of the circumferentially spaced ends of the first groove section.

Preferably, the first, fourth and fifth groove sections are substantially parallel to each other and preferably substantially straight and substantially parallel to the axis of the center pin.

DETAILED DESCRIPTION OF THE DRAWINGS

Figure 1:
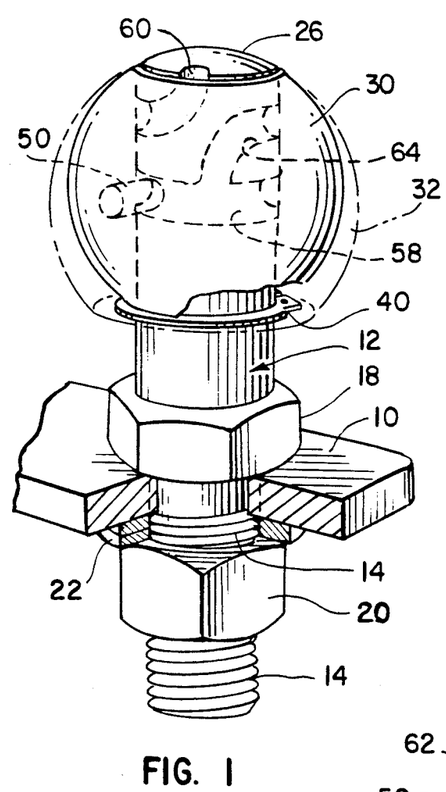
FIG. 1 is a perspective view of the ball hitch assembly, with parts broken away and with one hitch ball shown in full line and a larger diameter hitch ball shown in broken line.

The ball hitch assembly is shown mounted for use in FIG. 1 and is shown mounted to a tow bar 10 of a towing vehicle. The ball hitch assembly includes a center pin 12 having a substantial part of the length thereof threaded with a threaded end 14 and an intermediate threaded section 16 of a larger diameter. The intermediate threaded section 16 mounts a jam nut 18 which locates the center pin 12 relative to the upper side of the tow bar 10. The center pin can be firmly attached by advancing a nut 20 on the threaded section 14 of the center pin to compress a spring lock washer 22 against the underside of the tow bar 10.

An upper end 26 of the center pin 12 has a spherical shape to coact with the shape of a hitch ball to be mounted on the center pin.

Figure 2:
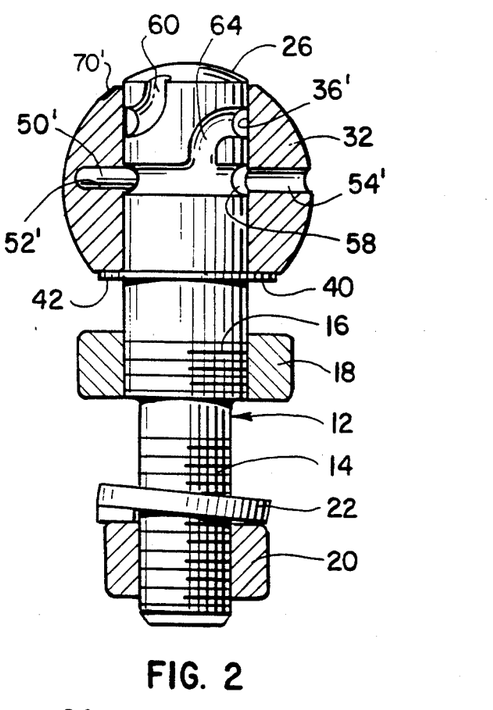
FIG. 2 is a central vertical section of the ball hitch assembly, shown unmounted to a tow bar and having a relatively larger diameter hitch ball mounted to a center pin shown in elevation.
Figure 3:
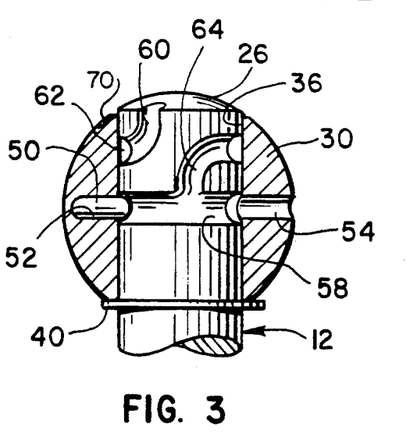
FIG. 3 is a fragmentary view, similar to the upper part of FIG. 2, showing the mounting of a smaller diameter ball to the center pin.
Figure 4:
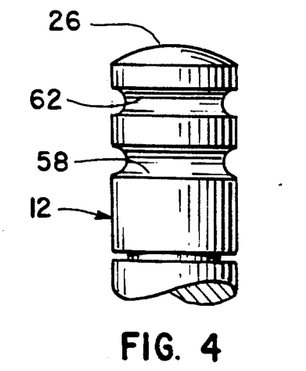
FIG. 4 is a fragmentary elevational view of the upper part of the center pin, looking toward the rear thereof as seen in FIGS. 2 and 3.

In order to illustrate the interchangeability of the hitch balls, two different hitch balls are shown in the drawings, including a hitch ball 30 in FIGS. 1 and 3 and a hitch ball 32 of a larger diameter in FIG. 2. The smaller diameter hitch ball 30 is shown in full line in FIG. 1 and the larger diameter hitch ball 32 is shown in broken line in FIG. 1.

Each of the hitch balls is of the same basic structure. Referring to the hitch ball 30, shown in FIG. 3, the hitch ball has a central opening 36 to receive the upper end of the center pin 12. The movement of the hitch ball 30 onto the center pin 12 is limited by means mounted on the center pin in the form of an external snap ring 40 fitted in a groove in the center pin. The positioning of both of the hitch balls 30 and 32 axially of the center pin is the same with the larger diameter hitch ball 32 being shortened in the direction of the central opening 36', with the resulting formation of a shoulder 42 thereon.

Each of the hitch balls and the center pin has coacting fixed locking pin and groove structure to enable releasable locking of a hitch ball to the center pin with removal and mounting of a hitch ball being accomplished without the use of any tools. The fixed pin and groove structures are associated one with the hitch ball and the other with the center pin. In a preferred embodiment, the fixed locking pin is carried by the hitch ball and the groove structure formed on the periphery of the center pin.

Again referring to the hitch ball 30, a fixed locking pin 50 of hardened metal and having a spherical end is mounted in a recess 52 in the hitch ball. The recess 52 can be formed by drilling, with the drill first making an access hole 54 and then crossing the central opening 36 and drilling the recess 52. The recess 52, not opening to the exterior of the hitch ball, forms a bottom against which the locking pin can be pressed to achieve a fixed mounting thereof in the recess 52.

The center pin 12 has the groove structure including a first circumferentially extending locking/retaining groove 58 which surrounds the center pin. As seen in FIGS. 2 and 3, the locking groove cross section has a diameter greater than the spherical end of the fixed locking pin 50 whereby, with the hitch ball located axially by the external snap ring 40, the spherical end of the locking pin is intermediate the top and bottom of the locking groove. There can be upward movement of the hitch ball 30 along the center pin and away from the external snap ring 40 to some limited extent. The groove structure also includes second groove means extending from the spherical end 26 of the center pin to the locking groove 58, with this groove structure including an entry groove section 60 opening to the spherical end of the center pin and extending generally spirally thereof to communicate with a circumferential groove section 62 which extends around substantially the entire circumference of the center pin to terminate in a groove section 64 which extends spirally of the center pin and connects the groove section 62 with the locking groove 58. An alternative construction can have a spiral groove of substantial peripheral extent leading to the locking groove 58 with the circumferential groove 62 omitted.

The hitch ball can be mounted and removed from the center pin by a twisting motion and movement axially of the center pin. With reference to FIG. 3, a person may place his hand on the hitch ball and rotate the ball in a counterclockwise direction approximately one-quarter revolution to align the fixed locking pin 50 with the groove section 64 and, with a twisting pull on the hitch ball, the hitch ball will then move outwardly of the center pin until the fixed locking pin 50 reaches the circumferential groove section 62. A further twist of more than one-half revolution will bring the locking pin 50 to the groove section 60 to enable removal of the hitch ball from the center pin.

These motions can be reversed to place the hitch ball on the center pin and, with the center pin 50 having its spherical end in the locking groove 58, the hitch ball can rotate through substantially an entire revolution and remain locked. The only location for hitch ball removal is with the locking pin aligned with the groove section 64. The socket of a trailer hitch clamps onto the hitch ball and can pull the hitch ball upwardly a limited amount along the center pin 12.

The trailer hitch rests on the spherical end 26 of the center pin 12 and the ball hitch can only rise to a position tangent with the spherical end. In this position, the spherical end of the fixed locking pin is still loose in the locking groove 58. The hitch balls of different diameters all have the same length axially of the central opening 36 and fixed locking pin 50 at the same distance from the upper and lower ends of the hitch ball. These distances need not be equal and are dependent on the location of the locking groove 58 and the snap ring 40 on the center pin 12.

To assure that the fixed locking pin 50 is remote from the groove section 64 when a trailer hitch is attached to the hitch ball, the hitch ball can have an indent or other marking on its surface, as indicated at 70, to indicate alignment with the fixed locking pin 50 in order to have the hitch ball in a rotative position substantially diametrically opposite the groove section 60, which places the fixed locking pin 50 substantially diametrically opposite the groove section 64.

As previously stated, each of the hitch balls is of the same construction except for differing diameter and, thus, the formation of the shoulder 42 on the hitch ball of the larger diameter. The structure of the hitch ball 32 corresponding to that of hitch ball 30 is given the same reference numeral with a prime affixed thereto.

In summary, there are no tools required to change from one size hitch ball to either a smaller or a larger size hitch ball. The groove structure leading to the locking groove enables the hitch ball to be installed by hand, but when the trailer hitch socket is attached to the hitch ball, the hitch ball cannot detach from the center pin. A vehicle owner wishing to pull different trailers having different trailer hitches may have the suitable diameter hitch balls available and stored in the vehicle, such as in the glove compartment, and mount or interchange a hitch ball when required for a particular trailer hitch.

DETAILED DESCRIPTION OF THE PREFERRED EMBODIMENT

In FIGS. 5-8, one modified form of ball hitch assembly, according to the present invention, is shown generally at 110. The ball hitch assembly 110 consists of a center pin 112 with a stepped configuration including a cylindrical, upper, large diameter mounting part 114 and a reduced diameter threaded end 116. An intermediate portion 118 of the center pin 112 is threaded to accept a jam nut 120 having an underside surface 122 which, in conjunction with a mounting nut 124, captively engages a tow bar/bumper 126 on the towing vehicle (not shown). The pin end 116 extends through a bore 128 in the tow bar/bumper so that the jam nut 120 rests on the upper surface 130 of the tow bar/bumper 126. A locking washer 132 is placed over the threaded pin end 116 before the nut 124 is threaded on and is borne against the underside surface 134 of the tow bar/bumper 126 to positively maintain the center pin 112 on the tow bar/bumper 126, as in the prior embodiment.

The principal distinction between the ball hitch assembly shown in FIGS. 1-4 and that 110 shown in FIGS. 5-8 resides in the configuration of the groove 136 cut into the peripheral surface 138 of the upper pin mounting portion 114.

More specifically, the groove 136 is continuously formed between an entryway 140 and a first groove section 142. The first groove section 142 is a circumferential groove extending at least 180° around the center pin portion 114 and preferably through a full 360°. A second groove section 144 communicates between the entryway 140 and the first groove section 142. The second groove section 144 has a circumferential portion 146 extending through approximately 330° and spaced axially above the first groove section 142, a first transition part 148 communicating between the entryway 140 and one end 150 of the circumferential groove portion 146, and a second transition portion 152 communicating between the other end 154 of the circumferential portion 146. The transition portions 148, 152 are generally parallel to each other and extend generally axially at an acute angle α with respect to the center axis 156 of the center pin 112.

Figure 5:
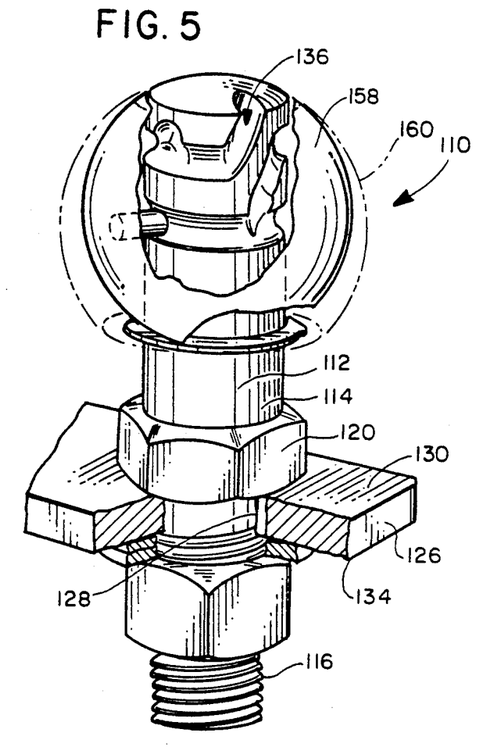
FIG. 5 is a perspective view, similar to that in FIG. 1, of a modified form of ball hitch assembly according to the present invention.
Figure 6:
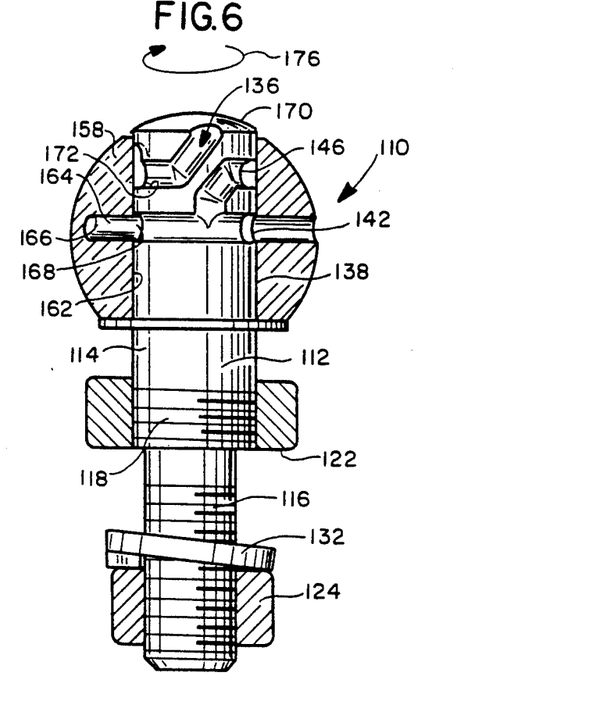
FIG. 6 is an elevation view of one side of the ball hitch assembly of FIG. 5 with a hitch ball thereon shown in section in its operative position.
Figures 7, 8, 9, 10:
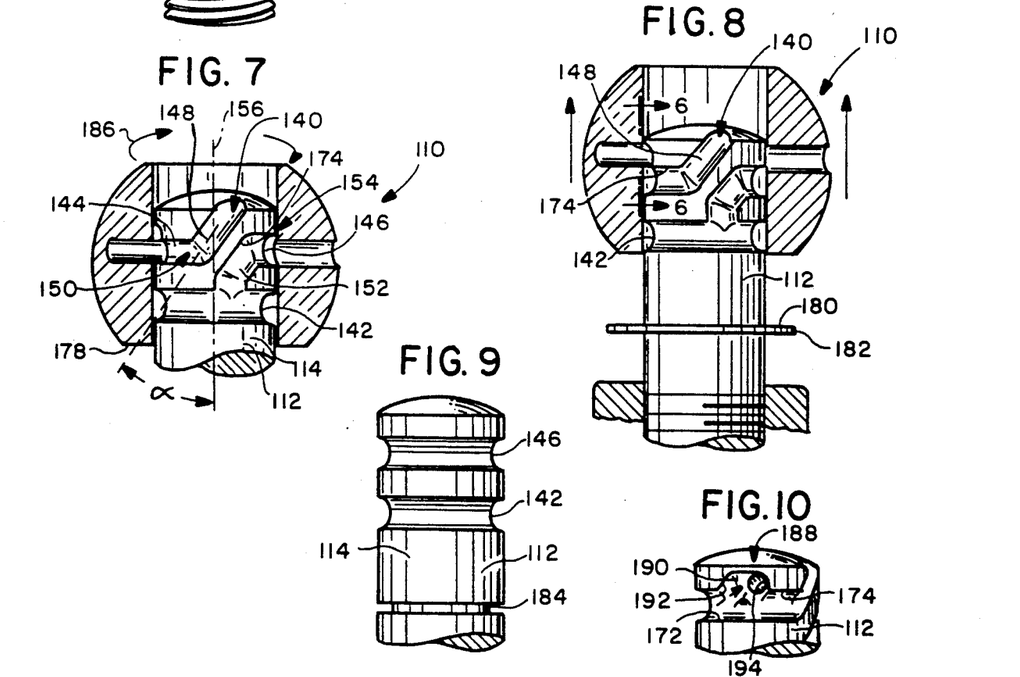
FIG. 7 is an elevation view of the top portion of the ball hitch assembly, as shown in FIG. 6, with the hitch ball twisted relative to the center pin in the process, of being removed therefrom.
FIG. 8 is a view similar to that in FIG. 7 with the hitch ball shown in a safety lock position in which inadvertent disassembly of the hitch ball from the center pin is prevented.
FIG. 9 is an elevation view of the top portion of the center pin taken from the side opposite that shown in FIG. 6.
FIG. 10 is an elevation view of the top of the center pin rotated to be approximately midway between the FIG. 6 and FIG. 9 positions and showing a locking pin on the hitch ball in the safety lock position corresponding to that in FIG. 8.

The center pin 112 is configured to cooperate with different size hitch balls 158, 160, shown respectively in solid and phantom lines in FIG. 5. The smaller hitch ball 158 is used for illustration in FIGS. 6-9 and has a central opening/bore 162 to closely receive the peripheral surface 138 of the center pin 112. A hardened metal locking/guide pin 164 is fixedly mounted in a radial, blind bore 166 in the hitch ball 158 so that the free end 168 thereof projects into the opening/bore 162 to cooperate with the center pin groove 136.

By aligning the upper free end 170 of the center pin 112 with the central opening/bore 162 in the center pin 112, the hitch ball 158 can be assembled by a simple turning step. Upwardly and downwardly facing guide walls 172, 174, respectively, bound the groove 136 and define guide surfaces for the free end 168 of the locking/guide pin 164 during assembly and disassembly thereof.

To effect assembly of the hitch ball 158, the pin free end 168 is aligned at the groove entryway 140 and directed downwardly and in a rotational direction indicated by arrow 176 around the center axis 156, against the guide wall 172 downwardly through the transition portion 148, around the circumferential portion 146 between the ends 150, 154 thereof, down the transition part 152 and into the first groove section 142. With the pin free end 168 in the groove section 142, the hitch ball 158 is in the operative position shown in FIGS. 5 and 6 and is free to rotate freely on the center pin 112. The guide wall 172 is smooth and uninterrupted between the entryway 140 and the groove section 142. In the operative position for the hitch ball 158, an underside surface 178 thereon bears on an upwardly facing surface 180 on a snap ring 182 fit in an annular, undercut groove 184 in the center pin 112.

When it is desired to remove the hitch ball 158, the user draws up on the hitch ball 158 as it is turned in the direction of arrow 186 about the central pin axis 156. Once the hitch ball 158 is twisted to the point that the free pin end 168 aligns with the transition portion 152, further upward force on and rotation of the hitch ball 158 bears the free pin end 168 against the wall 174 which guides the pin end 168 through the transition portion 152 and around the circumferential portion 146. The present invention is specifically directed to structure for preventing inadvertent separation of the hitch ball 158 from the center pin 112 during use. The present invention contemplates a safety locking feature at 188 to prevent the pin free end 168 from travelling along the guide wall 174 fully through the circumferential groove portion 146 where it may communicate through the transition portion 148 out the entryway 140. This safety feature 188 is shown clearly in FIG. 10.

An axially offset pocket 190 is cut into the center pin 112 to interrupt the guide wall 174. Upward pressure on the hitch ball 158 in the vicinity of the pocket 190 causes the free pin end 168 to travel up an inclined edge 192 from where it is guided against an abutment 194 which arrests further rotation of the hitch ball 158 relative to the center pin 112. The hitch ball 158 can be released from the safety lock position of FIG. 10 by pressing down on the hitch ball 158 to space the pin free end 168 beneath the pocket 190 so that it can then be moved through the remainder of the circumferential groove portion 146, through the transition portion 148 and out the entryway 140.

Under normal conditions, it is possible for the trailer to lift the hitch ball 158 as the vehicle turns relative to the trailer. The presence of the pocket 190 prevents separation of the hitch ball 158 from the center pin 112 upon this occurring.

A modified form of ball hitch assembly, according to the present invention, is shown at 196 in FIGS. 11-14. The ball hitch assembly 196 consists of a center pin 198 that is mountable on a tow bar/bumper (not shown) in the same manner as the embodiments previously discussed. The principal distinction between the assembly 196 and those in FIGS. 1-10 is the configuration of the guide/locking groove 200.

Figure 13:
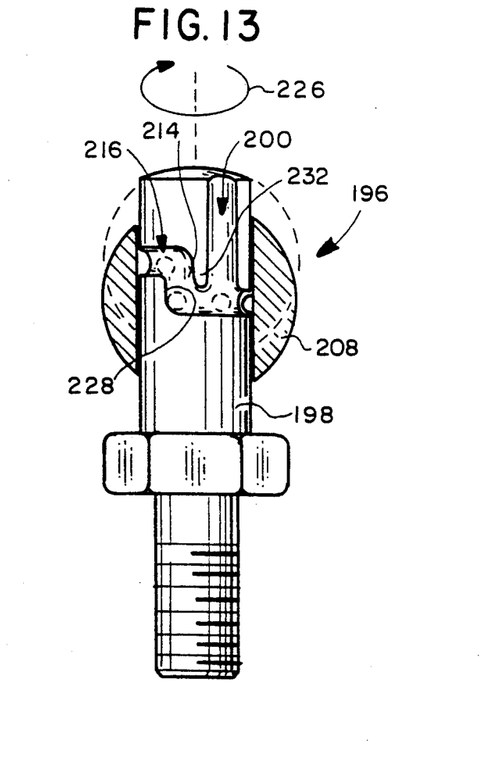
FIG. 13 is a view similar to that in FIG. 12 with the center pin rotated about its axis through approximately 30° and showing a hitch ball in solid lines in a transition position and in phantom in an operative position with respect to the center pin.
Figure 14:
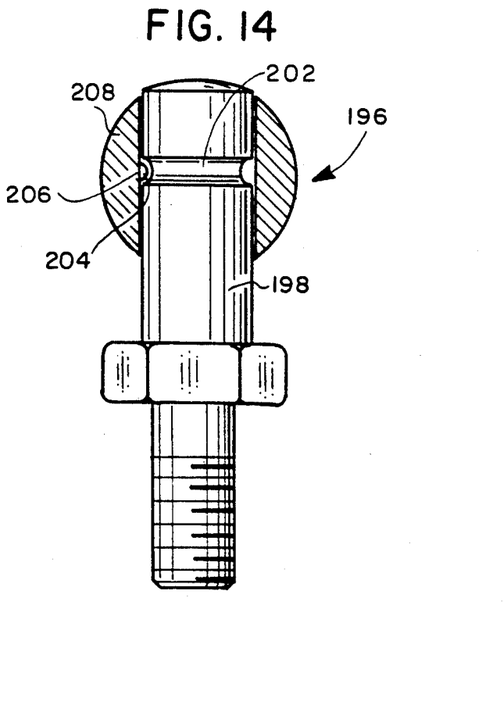
FIG. 14 is an elevation view of the center pin taken from the side opposite that of FIG. 12 and showing the hitch ball thereon in its operative position.

The groove 200 has a first, circumferential section 202 extending through approximately 330 in which the free end 204 of a guide pin 206 resides with a hitch ball 208 carrying the guide pin 206 in its operative position, shown in FIG. 14 and in phantom lines in FIG. 13. The groove 200 has a second, generally axially extending section 210 which communicates with a third, circumferential groove section 212 that is spaced axially beneath the first groove section 202. A fourth, transition groove section 214 connects the third groove section 212 with one end 216 of the first groove section 202. A fifth, transition groove section 218 connects the third groove section 212 with the other end 220 of the first groove section 202. The second, third and fourth groove sections cooperatively define a J-shape. The second, third and fifth groove sections cooperatively define a backward J-shape.

To effect assembly of the hitch ball 208, the free pin end 204 is directed downwardly through an entryway 222 for the groove 200, through the second groove section 210 and against an upwardly facing guide wall 224 bounding the third groove section 212. This represents the transition position for the hitch ball 208 and is shown in solid lines in FIG. 13. Rotation of the hitch ball 208 in the direction of arrow 226 in FIG. 13 brings the pin end 204 against a circumferentially facing shoulder 228 whereupon the hitch ball 208 can be moved axially upwardly, aligned with and turned into the first groove section 202 into its operative position, shown in phantom in FIG. 13.

Alternatively, with the free pin end 204 in the third groove section 212 at the bottom of the second groove section 210, the hitch ball 208 can be turned oppositely to the direction of arrow 226 to align with the fifth groove section through which it can be raised and directed into the first groove section 202 and its operative position.

It can be seen that as long as the hitch ball 208 is in its operative position, i.e. with the free pin end 204 in the groove section 202, the free pin end has no escape route from the groove 200. With the hitch ball 208 in its operative position, rotation of the hitch ball 208 in one direction causes the free pin end 204 to abut one axially extending wall 230 and, in the other direction, to abut another axially extending wall 232.

Figure 11:
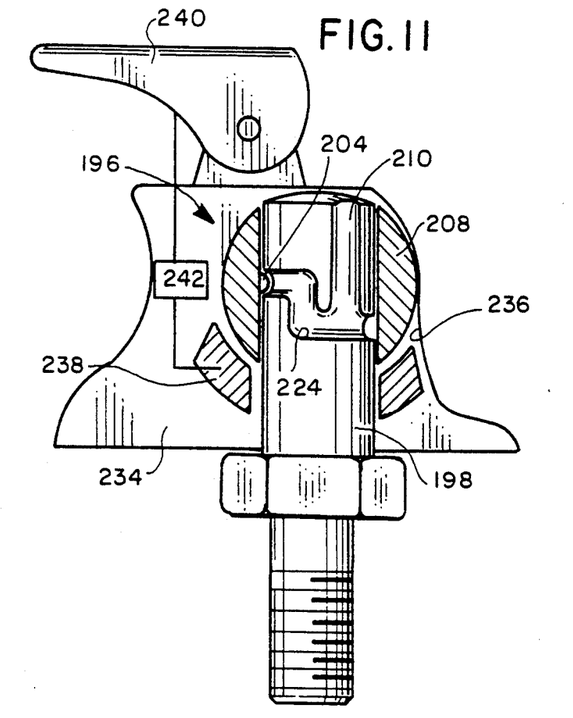
FIG. 11 is a schematic, side elevation view of a trailer coupling member operatively connected to a modified form of ball hitch assembly according to the present invention.
Figure 12:
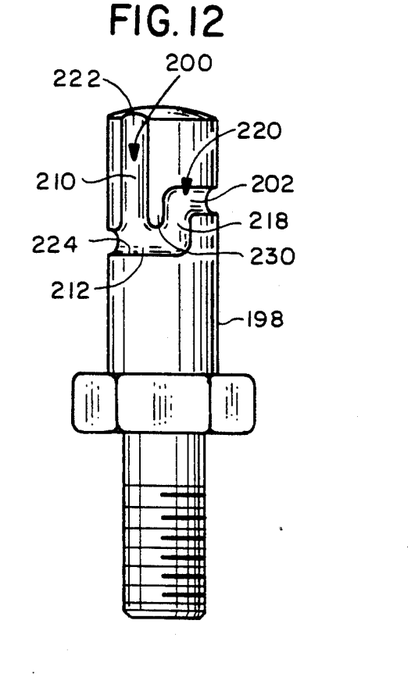
FIG. 12 is an elevation view from one side of a modified form of center pin according to the present invention.

In FIG. 11, the ball hitch assembly 196 is shown in relationship to the coupling tongue 234 of a trailer. The tongue 234 defines a receptacle 236 for the hitch ball 208. With the hitch ball 208 in the receptacle 236, a locking element 238 can be placed in a locked position, shown in FIG. 11, through a latch handle 240 operating through a conventional-type mechanism, shown schematically at 242. With the locking element 238 in its locked position, the hitch ball 208 is captively maintained in the receptacle 236. The hitch ball 208 abuts the locking element 238 before the pin end 204 can move sufficiently axially downwardly to allow it to migrate through the third groove section into the second groove section 210 to escape from the groove 200. Consequently, regardless of the force exerted on the hitch ball 208 and the relative movement between the trailer and towing vehicle, the hitch ball 208 remains positively secured on the center pin 198.

The hitch ball assembly 196 in FIGS. 11-14 does not require a snap ring or any other abutment to support the hitch ball 208 in its operative position. The hitch ball 208 is supported in an axial direction entirely by the pin end 204 and the guide wall 224 bounding the groove 200.

Figure 15:
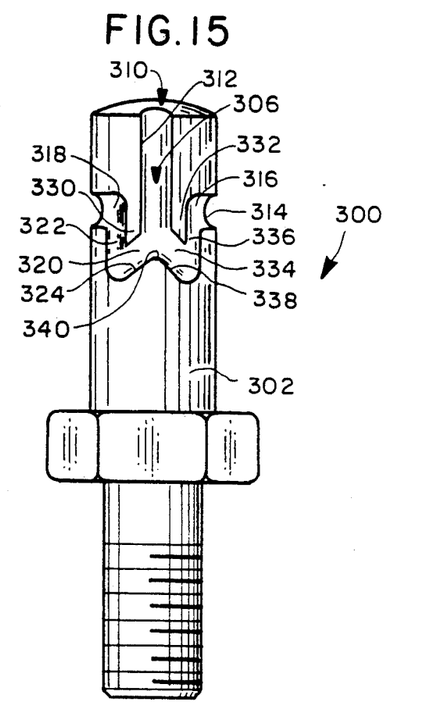
FIG. 15 is an elevation view from one side of a still further modified form of center pin according to the present invention.
Figure 16:
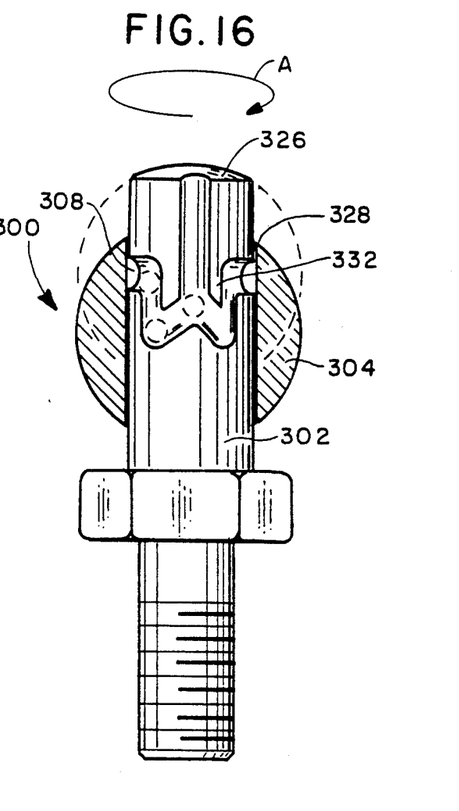
FIG. 16 is a view as in FIG. 15 showing a hitch ball in solid lines in a transition position and in phantom lines in an operative position with respect to the center pin of FIG. 15.
Figure 17:
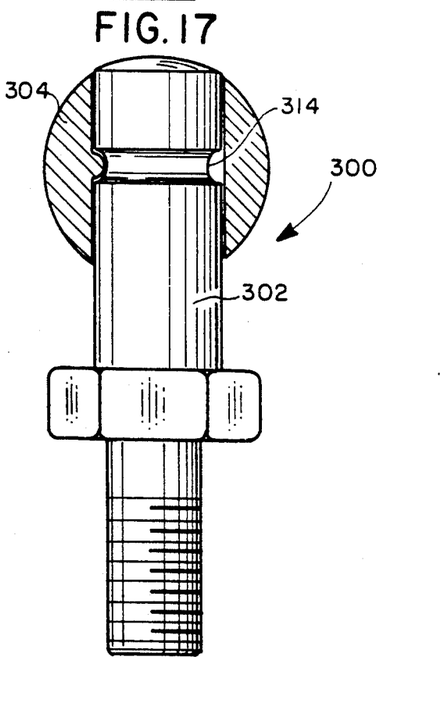
FIG. 17 is a side elevation view from the side opposite that in FIGS. 15 and 16 with the hitch ball in its operative position.

In FIGS. 15-17, a still further modified form of hitch ball assembly is shown at 300 and includes a center pin 302 with a cooperating hitch ball 304. The difference between the hitch ball assembly 300 and that in the prior embodiment is in the configuration of the groove 306 on the center pin 302. The hitch ball 304, as in the prior embodiments, has a locking pin 308 which moves within the groove 306.

The groove 306 has an entryway 310, a second groove section 312 that is substantially straight and parallel to the lengthwise axis of the center pin 302, and a first, circumferential groove section 314 with circumferentially spaced ends 316, 318.

A third groove section 320 extends angularly downwardly from the second groove section 312. A straight, fourth/transition groove section 322 communicates between the third groove section 320 and the end 318 of the circumferential groove 314.

In operation, the pin 308 is introduced at the entryway 310 and slid downwardly against an upwardly facing wall 324 bounding the third groove section 320. As the ball 304 is moved downwardly, the pin 308 encounters the wall 324 and causes the ball 304 to twist from a first rotational position in the direction of arrow A, to a second rotational position, shown in solid lines in FIG. 16. The upper end 326 of the center pin 302 projects through and slightly outwardly from the top 328 of the ball 304 with the ball 304 in its second rotational position. In the second rotational position for the ball 304, the pin 308 aligns beneath the fourth transition section 322, which is substantially straight and parallel to the second groove section 312.

By lifting up on the ball 304 with the ball 304 in its second rotational position, the pin 308 is caused to travel through the fourth transition groove section 322 up to the end 318 of the first groove section 314. With a hitch coupling attached to the ball 304, with the pin 308 at the juncture of the first and fourth groove sections 314, 322, the ball 304 is prohibited from sliding downwardly from the phantom position of FIG. 16. Rotation of the ball 304 in a counterclockwise direction, i.e. oppositely to the direction of arrow A, with the ball 304 so situated, causes the pin 308 to abut a wall 330 between the first and groove sections 312, 314, respectively. Clockwise pivoting of the ball 304 causes the pin 308 to abut a wall 332 between the first and second groove sections 314, 312, respectively. In other words, with the hitch coupling holding the ball 304 elevated to its operative height, shown in phantom in FIG. 16, there is no way for the pin 308 to find its way into the second groove section 312 to allow escape of the ball 304 from the center pin 302.

There is a fifth groove section 334 which extends angularly downwardly and oppositely to the third groove section 320. A straight, sixth transition groove section 336 communicates between the fifth groove section 334 and the end 316 of the circumferential groove section 314. The fifth groove section 334 is bounded by a wall 338 which, with the wall 324, defines an inverted V shape, with the apex 340 of the V aligned with the first groove section 312. The groove section 336 is preferably straight and parallel to each of the groove sections 312, 322 and the lengthwise axis of the center pin 302.

It can be seen that the pin 308 moving down the second groove section 312 will naturally fall on the wall 324. With a slight counterclockwise turn on the ball 304, the pin 308 could be brought against wall 338. In either event, once the wall 304 is raised after a turning action caused by the walls 324, 338, the pin 308 is introduced to the groove section 314.

To effect release of the ball 304, the ball 304 is pivoted until the pin 308 encounters either wall 330 or wall 332, whereupon it drops down into the juncture of groove 320, 322, in the former case, and 334, 336 in the latter case. By effecting a twisting motion and raising up on the hitch ball 304, the pin 308 is caused to move into the first groove section 312 whereupon it can be drawn out of the entryway 310 and separated from the center pin 302. The direction of the twisting action, with an upward force applied to the ball 304, depends upon the side of the second groove section 312 where the pin 308 resides.

The foregoing disclosure of specific embodiments is intended to be illustrative of the broad concepts comprehended by the invention.

We claim:

1. A ball hitch assembly comprising:
   a center pin mountable on a tow bar and having an axial extent;
   a hitch ball with a central opening mountable on the center pin;
   a cooperating locking pin and groove structure provided one on the center pin and the other on the hitch ball,
   said groove having an entryway through which the locking pin can pass as the center pin is directed into the hitch ball central opening;
   said locking pin being movable within the groove to allow the hitch ball to be placed in an operative position on the center pin; and
   locking means defined cooperatively by the locking pin and groove for preventing the hitch ball in its operative position from being disassembled from the center pin by drawing the hitch ball in one axial direction and turning the hitch ball in either direction of rotation about the axis of the center pin,
   wherein the groove is in the center pin and the locking pin is on the hitch ball,
   wherein the groove has a first generally circumferential groove section, a second groove section extending generally axially with respect to the center pin, a third groove section defining a wall which causes the locking pin on the hitch ball passing through the groove entryway and the first groove section in a first axial direction to be turned from a first rotational position to a second rotational position, and a fourth transition groove section for guiding movement of the locking pin with the hitch ball in its second rotational position into the first groove section by movement of the hitch ball in a direction opposite to the first axial direction.

2. The ball hitch assembly according to claim 1 wherein the second and fourth groove sections are substantially parallel to each other.

3. The ball hitch assembly according to claim 1 wherein the second and fourth groove sections are substantially parallel to the axis of the center pin.

4. The ball hitch assembly according to claim 1 wherein there is a fifth groove section having a wall which defines an inverted V shape with the wall defined by the third groove section.

5. The ball hitch assembly according to claim 4 wherein the first groove section has circumferentially spaced ends, the fourth transition groove section communicates with one of the circumferentially spaced ends of the first groove section and there is a sixth transition groove section communicating between the fifth groove section and the other of the circumferentially spaced ends of the first groove section.

6. The ball hitch assembly according to claim 5 wherein the fourth and sixth groove sections are substantially parallel to each other.

7. The ball hitch assembly according to claim 5 wherein the fourth and sixth groove sections are substantially parallel to the axis of the center pin.

8. The ball hitch assembly according to claim 5 wherein the second, fourth and sixth groove sections are substantially straight and parallel to each other.

9. The ball hitch assembly according to claim 5 wherein the second, fourth and sixth groove sections are substantially straight and parallel to the axis of the center pin.

10. The ball hitch assembly according to claim 4 wherein the second groove section is substantially straight and the V defined by the walls of the third and fourth groove sections is in the line of the first groove section.

11. A ball hitch assembly comprising:
    a center pin mountable on a tow bar and having an axial extent;
    a hitch ball with a central opening mountable on the center pin;

a cooperating locking pin and groove structure provided one on the center pin and the other on the hitch ball, said groove having an entryway through which the locking pin can pass as the center pin is directed into the hitch ball central opening;

said locking pin being movable within the groove to allow the hitch ball to be placed in an operative position on the center pin in which operative position the hitch ball is engageable by a hitch coupling, said groove having a first circumferential groove section in which the locking pin resides with the hitch ball in its operative position on the center pin, said locking pin being movable in the circumferential groove section to allow the hitch ball to rotate on the center pin with the hitch ball in its operative position on the center pin; and locking means defined cooperatively by the locking pin and groove for preventing the hitch ball in its operative position from being dissembled from the center pin by drawing the hitch ball in one axial direction and turning the hitch ball in either direction of rotation about the axis of the center pin.

12. The ball hitch assembly according to claim 11 wherein the groove is in the center pin and pin is on the hitch ball.

13. A ball hitch assembly comprising:
a center pin mountable on a tow bar and having an axial extent;
a hitch ball with a central opening mountable on the center pin;
a cooperating locking pin and groove structure with the groove in the center pin and the locking pin on the hitch ball,
said groove having an entryway through which the locking pin can pass as the center pin is directed into the hitch ball central opening,
said locking pin being movable within the groove to allow the hitch ball to be placed in an operative position on the center pin; and
locking means defined cooperatively by the locking pin and groove for preventing the hitch ball in its operative position from being disassembled from the center pin by drawing the hitch ball in one axial direction and turning the hitch ball in either direction of rotation about the axis of the center pin,
wherein the center pin has a first generally circumferential groove section, a second groove section extending generally axially with respect to the center pin, a third groove section having at least a part thereof spaced axially from said first groove section and a fourth transition groove section between the third and first groove sections, said groove sections being arranged so that the locking pin resides in the first groove section with the ball in its operative position on the center pin and the locking pin passes connectively through the groove entryway, the second groove section, the third groove section, the fourth transition groove section and into the first groove section to realize its operative position on the center pin.

14. The ball hitch assembly according to claim 13 wherein the first groove section extends through at least 180°.

15. The ball hitch assembly according to claim 13 wherein the second and fourth groove sections are substantially straight, in parallel relationship, and aligned generally axially with respect to the center posit.

16. The ball hitch assembly according to claim 13 wherein the third groove section extends in a generally circumferential direction on the center pin.

17. The ball hitch assembly according to claim 13 wherein the groove is bounded by guide walls for the locking pin and with the hitch ball in its operative position the pin and guide walls provide the sole means for preventing axial shifting of the hitch ball relative to the center pin.

18. A ball hitch assembly comprising:
a center pin mountable on a tow bar and having an axial extent;
a hitch ball with a central opening mountable on the center pin;
a cooperating locking pin and groove structure with the groove in the center pin and the locking pin on the hitch ball,
said groove having an entryway through which the locking pin can pass as the center pin is directed into the hitch ball central opening,
said locking pin being movable within the groove to allow the hitch ball to be placed in an operative position on the center pin; and
locking means defined cooperatively by the locking pin and groove for preventing the hitch ball in its operative position from being disassembled from the center pin by drawing the hitch ball in one axial direction and turning the hitch ball in either direction of rotation about the axis of the center pin,
wherein the center pin has a first generally circumferential groove section and a second groove section communicating between the entryway and the first groove section, said second groove section having a guide wall for guiding axial movement of the locking pin between the entryway and the first groove section, said second groove section having a guide wall for guiding axial movement of the locking pin between the entryway and the first groove section, said guide wall having an axially offset pocket defined therein to receive the locking pin and thereby arrest rotation of the hitch ball being urged from its operation position axially in one direction and rotated in one direction relative to the center pin to thereby prevent inadvertent separation of the hitch ball from the center pin.

19. The ball hitch assembly according to claim 18 wherein the second groove section extends in a generally circumferential direction at that portion of the second groove section where the pocket is located.

20. The ball hitch assembly according to claim 18 wherein the first groove section extends through approximately 180°°about the center pin.

21. The ball hitch assembly according to claim 18 wherein the second groove part is smoothly inclined between the groove entryway and the first groove section.

22. The ball hitch assembly according to claim 18 including means on the center pin axially spaced from the hitch ball in its operative position for preventing shifting of the hitch ball axially in one direction relative to the center pin.

23. The ball hitch assembly according to claim 13 wherein the first groove section has circumferentially spaced ends, the fourth transition groove section communicating between the third groove section and one of the first groove ends and there is a fifth transition groove section which communicates between the third groove section and the other of the first groove ends.

24. The ball hitch assembly according to claim 13 wherein the second third and fourth groove sections cooperatively define a J-shape.

25. The ball hitch assembly according to claim 13 wherein the second third and fifth groove sections cooperatively define a J-shape.

26. In combination:
   (a) a ball hitch assembly comprising: a center pin mountable on a tow bar and having an axial extent; a hitch ball with a central opening mountable on the center pin in an operative position; a cooperating locking pin and groove structure provided one on the center pin and the other on the hitch ball, said groove having an entryway; said locking pin and groove including means for allowing the hitch ball to be placed in an operative position by aligning the locking pin with the groove entryway and directing the hitch ball in an assembly path axially in a first direction relative to the center pin to a transition position and pivoting the hitch ball about the center pin axis a predetermined amount relative to the center pin and urging the hitch ball axially oppositely to the first direction into its operative position, said groove having a circumferential section in which the locking pin resides with the hitch ball in an operative position on the center pin, said locking pin being movable in the circumferential groove section to allow the hitch all to rotate on the center pin with the hitch ball in its operative position on the center pin; and
   (b) a hitch coupling defining a receptacle for the hitch ball and having means thereon for preventing the hitch ball in the receptacle from moving from its operative position axially in the fist direction as might allow the hitch ball to trace back the assembly path for the ball hitch and thereby dissemble from the center pin.

27. The ball hitch assembly according to claim 26 wherein the groove has a J-shaped configuration.

28. The ball hitch assembly according to claim 24 wherein the locking pin is fixedly attached to the hitch ball.

29. A ball hitch assembly comprising:
   a center pin mountable on a tow bar and having an axial extent;
   a hitch ball with a central opening mountable on the center pin; and
   a cooperating locking pin and groove structure provided one on the center pin and the other on the hitch ball,
   said groove having an entryway through which the locking pin can pass as the center pin is directed into the hitch ball central opening,
   said locking pin being movable within the groove to allow the hitch ball to be placed in an operative position on the center pin,
   wherein the groove has a first circumferential groove section in which the locking pin resides with the hitch ball in an operative position on the center pin, and the groove extends from the entryway generally axially in one direction beyond said first circumferential groove section over a first part of the groove and axially oppositely to said one direction into the first circumferential groove section without retracing the first part of the groove,
   said locking pin and groove preventing the hitch ball in its operative position from being disassembled from the center pin by drawing the hitch ball in one axial direction and turning the hitch ball in either direction of rotation about the axis of the center pin.

* * * * *